(12) United States Patent
Fujii et al.

(10) Patent No.: US 9,815,473 B2
(45) Date of Patent: Nov. 14, 2017

(54) MANUAL TRANSMISSION CLUTCH CONTROL USING DRIVELINE MEASUREMENTS

(71) Applicant: FORD GLOBAL TECHNOLOGIES, LLC, Dearborn, MI (US)

(72) Inventors: Yuji Fujii, Ann Arbor, MI (US); Alex O. Gibson, Ann Arbor, MI (US); Gregory M. Pietron, Canton, MI (US); Joseph F. Kucharski, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 260 days.

(21) Appl. No.: 14/945,543

(22) Filed: Nov. 19, 2015

(65) Prior Publication Data

US 2016/0068163 A1    Mar. 10, 2016

Related U.S. Application Data

(63) Continuation-in-part of application No. 14/168,045, filed on Jan. 30, 2014, now Pat. No. 9,243,706.

(51) Int. Cl.

| | |
|---|---|
| *B60W 10/02* | (2006.01) |
| *B60W 20/00* | (2016.01) |
| *B60W 30/19* | (2012.01) |
| *B60W 10/06* | (2006.01) |
| *F16H 63/46* | (2006.01) |

(Continued)

(52) U.S. Cl.
CPC ............ *B60W 30/19* (2013.01); *B60W 10/02* (2013.01); *B60W 10/06* (2013.01); *F16D 48/06* (2013.01); *F16H 63/46* (2013.01); *B60W 20/40* (2013.01); *F16D 2500/1082* (2013.01); *F16D 2500/3065* (2013.01); *F16D 2500/30401* (2013.01); *F16D 2500/30814* (2013.01); *F16D 2500/30818* (2013.01); *F16D 2500/30822* (2013.01); *F16D 2500/30827* (2013.01); *F16D 2500/31413* (2013.01); *F16D 2500/31453* (2013.01); *F16D 2500/31466* (2013.01); *F16D 2500/50287* (2013.01); *F16D 2500/7041* (2013.01); *F16D 2500/7044* (2013.01); *F16D 2500/7061* (2013.01); *F16D 2500/70426* (2013.01); *F16D 2500/70458* (2013.01); *F16H 2059/147* (2013.01); *Y10T 74/2014* (2015.01)

(58) Field of Classification Search
CPC .............................. B60W 10/02; B60W 20/40
See application file for complete search history.

(56) References Cited

U.S. PATENT DOCUMENTS

| | | |
|---|---|---|
| 4,648,290 A | 3/1987 | Dunkley et al. |
| 5,002,170 A | 3/1991 | Parsons et al. |

(Continued)

*Primary Examiner* — Tisha Lewis
(74) *Attorney, Agent, or Firm* — James Dottavio; MacMillan, Sobanski & Todd, LLC (57) ABSTRACT

A method for controlling a manual transmission includes using a controller to determine a desired torque transmitted through an input clutch for the desired gear after a shift lever is moved to a desired gear position and while a clutch pedal is being released for engaging the clutch; inferring torque in the vehicle drive assembly; using inferred torque to determine clutch torque; and using the controller to automatically adjust a clutch actuator such that a difference between the desired torque and the inferred torque is reduced.

19 Claims, 5 Drawing Sheets

(51) Int. Cl.
    *F16D 48/06*     (2006.01)
    *F16H 59/14*     (2006.01)
    *B60W 20/40*     (2016.01)

(56) References Cited

U.S. PATENT DOCUMENTS

| | | |
|---|---|---|
| 5,206,805 A | 4/1993 | Petzold et al. |
| 5,571,059 A | 11/1996 | Desautels et al. |
| 5,679,099 A * | 10/1997 | Kato .................... F16D 48/066 |
| | | 192/54.3 |
| 5,871,419 A | 2/1999 | Amendt |
| 6,001,044 A | 12/1999 | Amendt |
| 6,364,809 B1 | 4/2002 | Cherry |
| 7,182,710 B2 | 2/2007 | Surampudi |
| 7,228,216 B2 | 6/2007 | Inoue |
| 7,300,381 B2 | 11/2007 | Badillo et al. |
| 7,473,209 B2 | 1/2009 | Todd et al. |
| 2003/0054920 A1* | 3/2003 | Berger .................. B60W 10/02 |
| | | 477/70 |
| 2004/0064232 A1* | 4/2004 | Eich ........................ F16D 48/06 |
| | | 701/68 |
| 2007/0265137 A1 | 11/2007 | Jiang |
| 2008/0064656 A1 | 3/2008 | Kue et al. |
| 2009/0186743 A1 | 7/2009 | Fodor et al. |
| 2010/0105523 A1* | 4/2010 | Hrovat .................. B60W 10/02 |
| | | 477/175 |
| 2011/0307153 A1 | 12/2011 | Razaznejad et al. |
| 2011/0320077 A1 | 12/2011 | Choi |
| 2014/0081559 A1 | 3/2014 | Kar |
| 2015/0120155 A1* | 4/2015 | Masunaga ............... F16H 61/06 |
| | | 701/54 |

* cited by examiner

MANUAL TRANSMISSION CLUTCH CONTROL USING DRIVELINE MEASUREMENTS

CROSS REFERENCE TO RELATED APPLICATIONS

The present patent application claims the benefit of and is a continuation-in-part of U.S. patent application Ser. No. 14/168,045, filed Jan. 30, 2014, which is incorporated herein by reference.

BACKGROUND OF INVENTION

This invention relates generally to a method for electronically controlling an input clutch of a manual transmission on the basis of direct, real-time driveline measurements inside the transmission or in a vehicle driveline.

The market share of vehicles equipped with manual transmissions remains low in this country partly due to operating complexity involved in the gear shifting process. A typical manual transmission system requires a coordinated use of feet to operate the transmission input clutch and throttle pedals while moving a shift fork through a hand-operated shift lever. It also requires a foot-based control to slip the clutch for driving a vehicle at a low speed.

Missed clutch release timing, poor clutch slip control or missed engagement timing results in a stalled engine or undesirable noise, vibration and harshness (NVH) such as clutch shudder.

A robotized manual transmission system with electronically-controlled input clutch has been in use for limited production applications. Its clutch control primarily relies on clutch actuator position and slip speed measurements at the sliding clutch plates during clutch release, slip and engagement processes. However, these measurements cannot be directly utilized to accurately compute torque transmitted through the slipping input clutch, so the system is not reacting directly to a measure of clutch torque. Consequently, such a system cannot reliably take corrective closed-loop actions in real time. More specifically, there is no reliable method to accurately estimate clutch torque based on clutch actuator position and slip speed across sliding clutch plates under all drive conditions because of limited understanding of dry clutch friction mechanisms. Accordingly, a conventional controller of the robotized manual transmission system is not well suited to detect undesirable NVH behaviors and take corrective closed-loop actions in real-time during clutch release, slip and engagement processes.

SUMMARY OF INVENTION

A method for controlling a manual transmission gearshift may include, a controller unlocking a shift-lever after a switch indicates a desired gearshift, and an accelerator pedal is released; after the shift-lever is moved to another gear, determining a desired clutch torque for the gear; measuring rotating component acceleration; inferring clutch torque based on the acceleration; automatically adjusting a clutch actuator such that a difference between the desired and inferred clutch torque is reduced.

A method for controlling a manual transmission gearshift may include determining, using a controller, a desired clutch torque for a desired gear after a shift-lever is moved to the desired gear, while a clutch pedal is being released; measuring rotating component acceleration; inferring a clutch torque based on the acceleration; reducing clutch torque error by automatically adjusting a clutch actuator such that a difference between the desired and inferred clutch torque is reduced.

A method for controlling a manual transmission gearshift may include, determining, using a controller, a desired clutch torque for a desired gear, after a shift-lever is moved to the desired gear, a clutch pedal is depressed and thereafter released, and an accelerator pedal is released and thereafter depressed; measuring rotating component acceleration; inferring clutch torque based on the acceleration; and automatically adjusting a clutch actuator such that a difference between the desired and inferred clutch torque is reduced.

A speed sensor, accelerometer and/or angular position sensor measuring a drivetrain component may infer a torque level transmitted through a driveshaft based on a proportional relationship between torque and acceleration. Such torque level may be used as a feedback signal to a clutch controller, which may reduce or eliminate engine stall and undesirable NVH occurrences such as clutch shudder. An advantage is a smoother, stall-free electronic clutch operation by correcting undesirable clutch behaviors. This may not only allow for improved shifting for an operator operating a clutch pedal, but also enable a driver to shift gears by manually moving a shift lever without directly operating the clutch.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

BRIEF DESCRIPTION OF DRAWINGS

The invention will be more readily understood by reference to the following description, taken with the accompanying drawings, in which.

DETAILED DESCRIPTION

Figure 1:
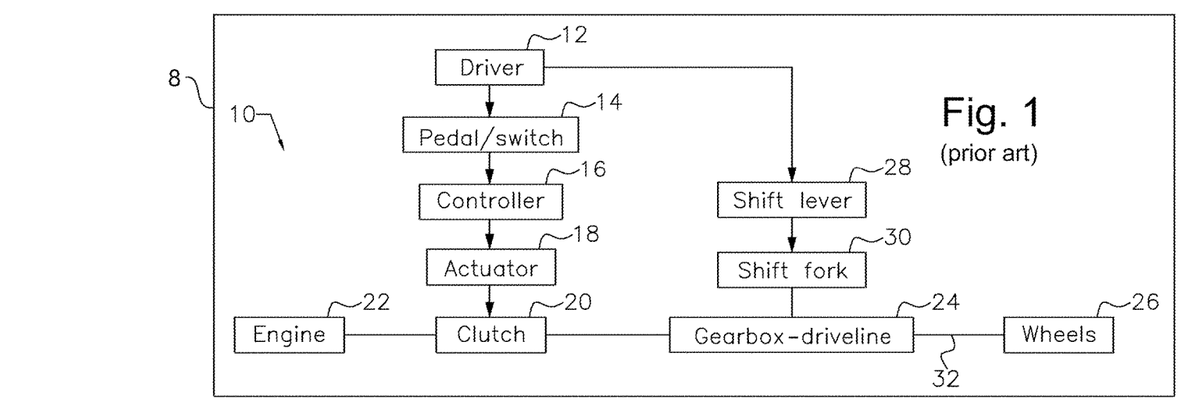
FIG. 1 is a schematic diagram showing a manual transmission system with electronically-actuated clutch system, according to a prior art design.

FIG. 1 shows a vehicle 8 having a manual transmission system 10, in which the vehicle operator 12 operates a pedal or switch 14, through which a signal representing the state of the switch 14 is transmitted to a controller 16, which manipulates an actuator 18, which controls the engaged, slipping and disengaged states of the input clutch 20. When referring to the term "transmission" herein, including the claims, this means a transmission with gear arrangement conventionally considered to be a manual transmission (as opposed to what is conventionally considered an "automatic" transmission), with a clutch that disengages the transmission during the gear shift process, at which time the vehicle operator manipulates some type of shifter, such as a shift lever, and the clutch then re-engages to complete the gear shift.

Torque produced by an engine 22, is selectively transmitted through clutch 20 to a manual gearbox-driveline 24 to the driven vehicle wheels 26 (the manual gearbox being another term for the manual transmission). The operator manually selects the operating gear of the gearbox 24 by moving a shift lever 28, which moves the shift fork 30 of the synchronizer that corresponds to the selected gear. The selected shift fork produces a drive connection between engine 22 through clutch 20, the selected gear and the transmission output shaft and driveshaft 32 to the driven vehicle wheels 26.

With reference to the clutch pedal and input clutch, as used herein, the clutch is released when the clutch pedal is said to be depressed. The clutch is engaged when the clutch pedal is said to be released. The clutch slips (clutch slipping/clutch sliding) while transmitting torque through frictional force when said to be partly released or partly engaged, with the clutch pedal partially depressed. So while the clutch pedal is being released (i.e., moving between the depressed clutch pedal position and the released clutch pedal position), the clutch slips.

Figure 2:
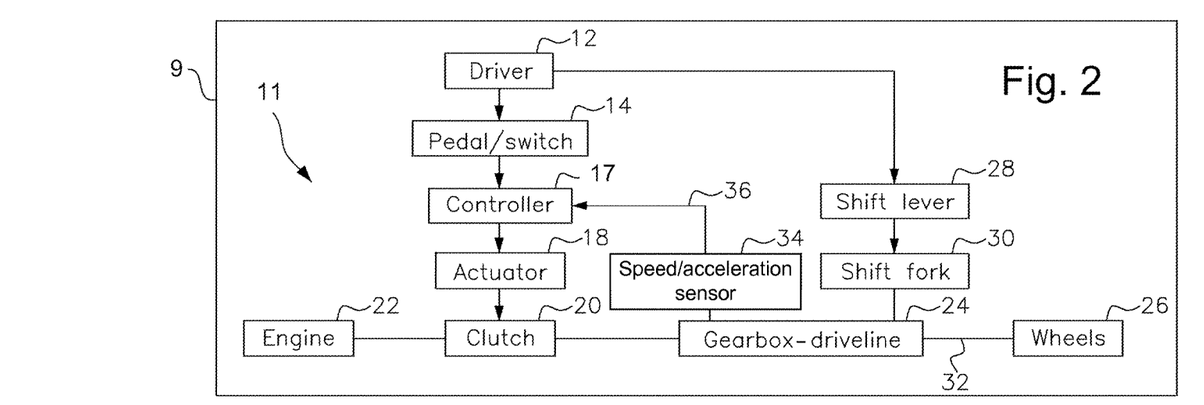
FIG. 2 is schematic diagram showing a manual transmission system having an electronically-actuated clutch system.

FIG. 2 shows a vehicle 9 having a manual transmission system 11. Since the vehicle described in this assembly is similar to the vehicle of FIG. 1, like reference numerals designate corresponding components in the drawings and the detailed description thereof will be omitted. The manual transmission system 11 includes a sensor 34. The sensor 34 may be a speed sensor that measures the rotational speed of a gearbox or driveline component in the transmission system 11, the sensor 34 may be an accelerometer that measures rotational acceleration of a gearbox or driveline component in the transmission system 11, the sensor 34 may be a high resolution angular position sensor, or two or all three types of these sensors 34 may be employed. When referring to measuring or employing speed or acceleration herein, including in the claims, this means a rotational speed or a rotational acceleration (rotating component acceleration), respectively, of the particular component in the vehicle driveline (transmission system), not a linear speed or a speed of the vehicle itself on the roadway.

The sensor 34 monitors the driveline parameter and provides a feedback signal 36 to clutch controller 17. Sensor 34 produces a signal that the clutch controller 17 converts to represent torque (inferred drive torque) on a shaft between input clutch 20 and the gearbox 24, or on a countershaft of the gearbox 24, or on the output shaft of the gearbox 24, but may be in other locations of the vehicle drive assembly, discussed with reference to FIG. 3. If the sensor 34 measures acceleration, then the clutch torque is inferred based on this acceleration measurement of the particular rotating component (such as for example a rotating drive shaft)—rotating component acceleration. If the sensor 34 measures speed, then the clutch torque is inferred based on the time derivative of measured angular velocity of the rotating component (such as for example the rotating drive shaft), which in effect also results in a measurement of acceleration—rotating component acceleration. If the sensor 34 measures angular position, then the clutch torque is inferred based on the time derivative of a determined angular velocity of the rotating component, which is in effect also results in a measurement of acceleration. Thus, for any of these three types of sensors, a measurement of acceleration is obtained for the controller to use relative to inferring clutch torque (i.e., torque transmitted across the clutch). The term clutch torque, as used herein including the claims, means the torque being transmitted through the clutch, whether the clutch is fully engaged or slipping (if the clutch is fully disengaged, of course the clutch torque is zero). The slipping condition is, of course, where determining the clutch torque is more difficult.

Figure 3:
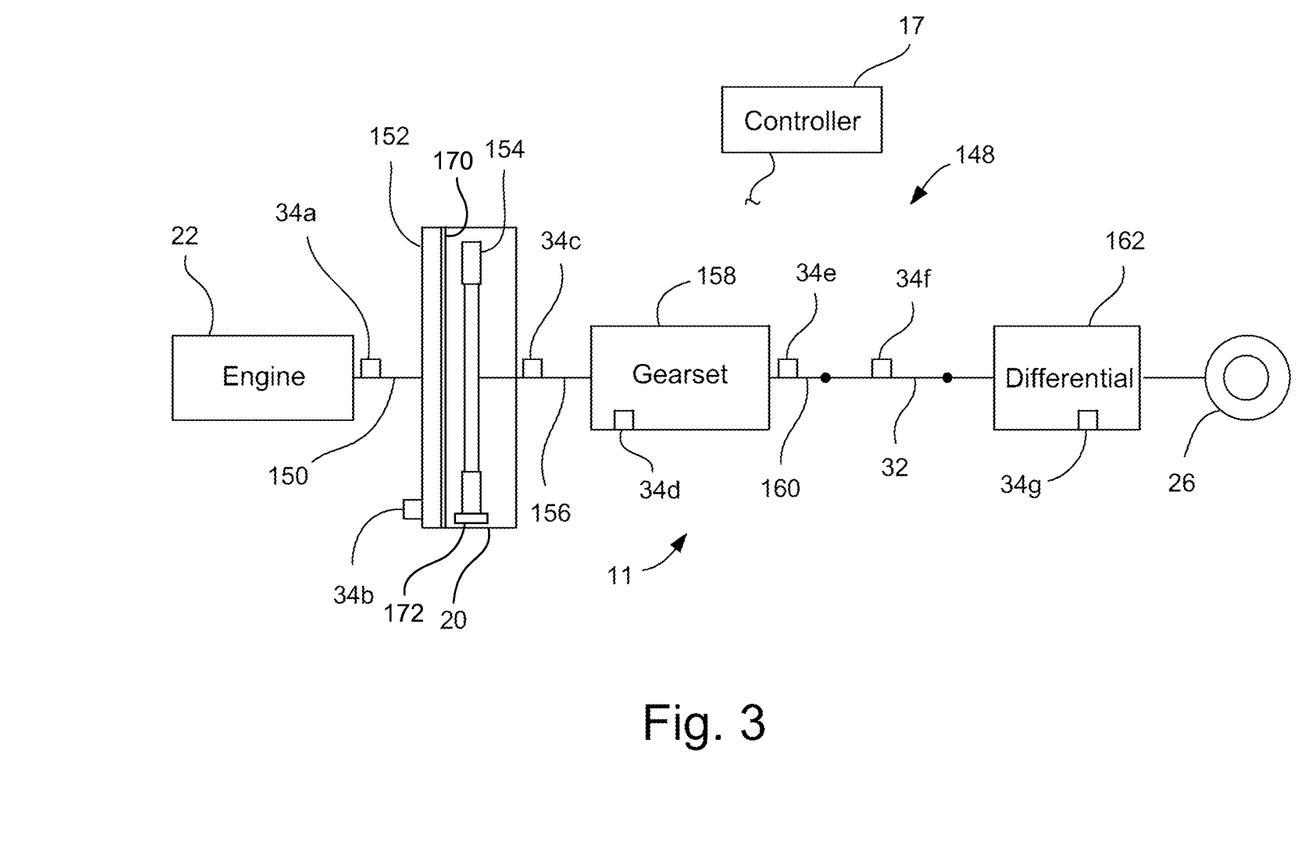
FIG. 3 is a schematic diagram of a vehicle drive assembly.

FIG. 3 schematically illustrates the vehicle drive assembly 148 and where the sensor 34 may be located therein, and will be discussed with reference to FIG. 2 also. The engine 22 connects through a crankshaft 150 to the input clutch 20. The clutch 20 may include a flywheel 152 and a clutch plate 154. Additionally, the clutch 20 may include other components such as a torsional damper 170 and a clutch actuator 172. A transmission input shaft 156 connects the clutch 20 to the gearbox (transmission)-driveline 24. The gearbox-driveline 24 may include a gear set (transmission) 158 driven by the input shaft 156, which, in turn, drives a transmission output shaft 160. The transmission output shaft 160 may connect to a drive shaft 32, which, in turn, drives a differential 162. The output from the differential 162, of course, drives the vehicle wheels 26.

The sensor(s) 34 may be located at one or more of the following locations in the vehicle drive assembly. While the sensor(s) 34 are shown at multiple locations in FIG. 3, there may be just one sensor 34 at one of these locations, or there may be multiple sensors 34 at different ones of the illustrated locations that transmit signals to the controller 17, with the controller 17 combining them (through averaging, accounting for a gear ratio between the locations or employing another suitable algorithm) to produce what is employed by the controller 17 as the inferred torque for controlling the clutch actuator 18. Having the torque calculated from multiple sensors may guard against noises in the measurement, to produce a more robust inferred torque, but, of course, having multiple sensors 34 increases the cost of the manual transmission system 11.

The sensor 34a may be located adjacent to the crankshaft 150, the sensor 34b may be located adjacent to the flywheel 152, the sensor 34c may be located adjacent to the transmission input shaft 156, the sensor 34d may be located adjacent to a component of the gear set 158, such as, for example a countershaft (not specifically shown). The sensor 34e may be located adjacent to the transmission output shaft 160, the sensor 34f may be located adjacent to the drive shaft 32, the sensor 34g may be located adjacent to a component of the differential 162.

At any one (or more) of these locations, the sensor may send a feedback signal 36 to the controller 17, which the controller 17 uses to infer torque transmitted at the clutch plate 154. The computation of torque transmitted through the clutch plate 154 can be achieved by scaling measured acceleration or time derivative of speed values (in effect, acceleration) with the known gear ratio between the clutch plate 154 and torque sensing location. Alternatively, the computation of clutch torque at the clutch plate 154 based on measurements at other locations of the vehicle drive assembly may be accomplished, for example, by methods discussed in U.S. Pat. No. 8,510,003, incorporated herein by reference.

The sensor(s) 34 employed may be an accelerometer designed to measure rotational acceleration, may be a high resolution speed sensor designed to measure rotational speeds at sufficiently short intervals to take a time derivative of angular velocity of the component being measured in order to generate an acceleration value, or may be a high resolution angular position sensor to determine speed and hence acceleration of a rotating component. The measurement may then be employed in the operation of the manual transmission system 11.

Figure 4:
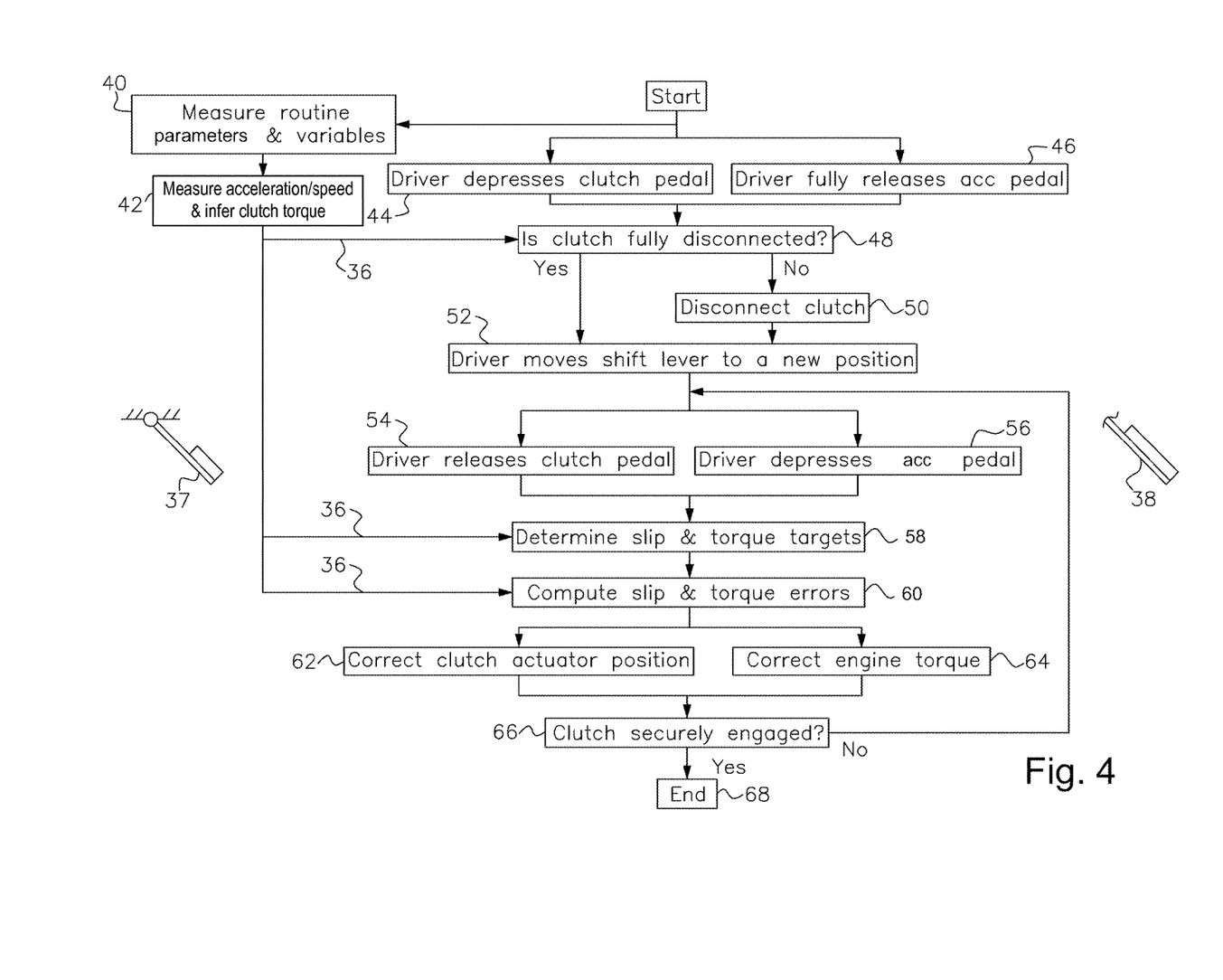
FIG. 4 is a logic diagram representing an algorithm for controlling a gearshift of the manual transmission system of FIG. 2.
Figure 5:
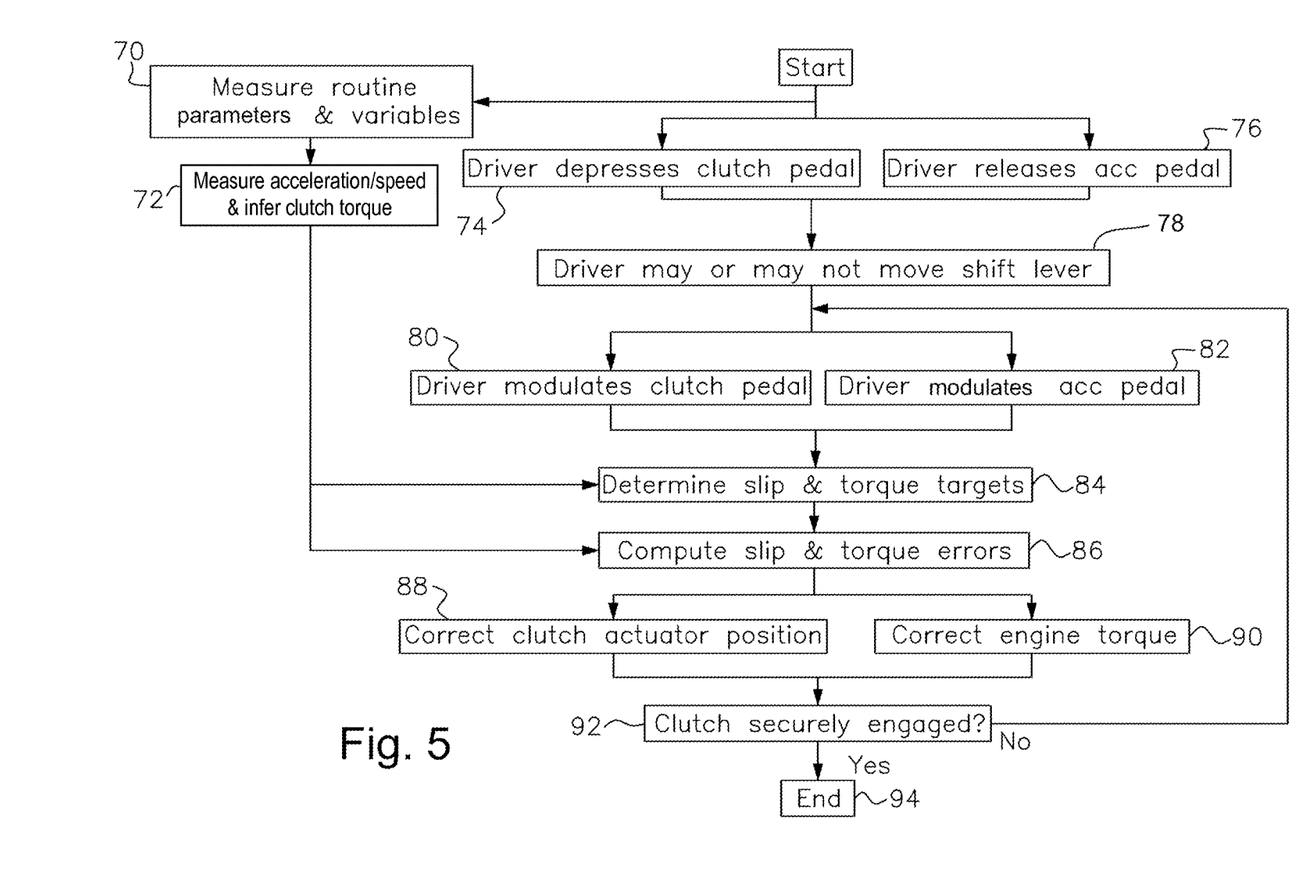
FIG. 5 is a logic diagram representing an algorithm for controlling an input clutch slip of the manual transmission system of FIG. 2.

FIGS. 4 and 5 will now be discussed relative to the vehicle of FIGS. 2 and 3. While a clutch pedal 37 and an accelerator (acc) pedal 38 are shown only in FIG. 4, they are also applicable in the control method of FIG. 5, and as applicable, to FIG. 6. In the clutch-assist mode illustrated in FIGS. 4 and 5, the vehicle operator (driver) 12 manually operates a clutch pedal 37, accelerator pedal 38 and the gear shift lever 28. The control method automatically corrects clutch operation based on the inferred torque signal 36 in order to, for example, prevent undesirable clutch NVH and engine stall conditions.

A clutch-assist mode for shifting gearbox 24/gearset 158 will now be discussed relative to FIG. 4, in view of FIGS. 2 and 3.

At step 40 the state of the transmission such as gear position is identified and routine powertrain parameters and variables, such as vehicle speed, engine throttle position, engine speed and the speed of various shafts are measured.

At step 42 acceleration (or speed or angular position) of a rotating component of the transmission system 11 is measured by sensor(s) 34, a signal representing that magnitude is transmitted to controller 17, obtaining a rotating component acceleration. The controller 17 uses the rotating component acceleration to compute inferred torque transmitted through the input clutch 20, accounting for the gear ratio between the clutch plate location 154 and the measurement location. The inferred torque may be based on the measured acceleration or the time derivative of the measured angular velocity (in essence, acceleration) of the component, which may be for example one of the components shown and discussed relative to the sensors 34 of FIG. 3. The controller 17 may use a lookup table for the particular vehicle and drivetrain to convert the input data (acceleration or speed or angular positions) into the inferred clutch torque. Such data may be produced empirically through measurements of the particular drivetrain and vehicle. Alternatively, the controller 17 may employ mathematical equations to convert the measured value from the sensor 34 to the inferred clutch torque. Also, as discussed above, there may be multiple sensors sending acceleration and/or speed signals to the controller, which then combines these inputs and calculates an inferred clutch torque.

At step 44 the operator fully depresses the clutch pedal 37, which controls the state of clutch 20.

At step 46 the operator fully releases the accelerator pedal 38.

At step 48 a test is performed to determine whether clutch 20 is fully disengaged. If the clutch is not fully disconnected, at step 50 clutch 20 is automatically fully disengaged by controller 17.

At step 52 the operator moves shift lever 28 to the position corresponding to the desired gear to be produced by the gearshift.

At step 54 the operator gradually releases the clutch pedal 37, allowing the clutch to drag (slip), while the operator depresses the accelerator pedal 38, step 56.

At step 58 the controller 17 determines the magnitude of desired clutch slip and desired clutch torque across the slipping clutch 20.

At step 60 controller 17 computes (i) clutch slip error, i.e., the difference between desired clutch slip at step 58 and clutch slip represented by differential speed across clutch 20 as measured at step 40; and (ii) clutch torque error, i.e., the difference between inferred clutch torque at step 42 and desired clutch torque at step 58. A deviation of inferred clutch torque from the desired level may be caused by operator's clutch pedal control error or may be due to undesirable clutch frictional behaviors such as stick-slip.

At step 62 controller 17 automatically corrects the position of the clutch actuator 18 on the basis of clutch torque error and slip error, such that the errors are reduced, minimized or eliminated.

At step 64 controller 17 automatically corrects engine torque such that the adjusted engine torque augments clutch actuator control 62 to reduce, minimize or eliminate clutch torque and slip error and such that engine torque is compatible with the current diving conditions: vehicle speed, throttle position and the newly engaged gear.

At step 66 a test is performed to determine whether clutch 20 is fully engaged. If the clutch is not fully engaged, control returns to steps 54 and 56.

If the clutch is securely engaged, control of clutch-assist mode shifting ends at 68.

A clutch-assist mode for controlling slip of clutch 20 will now be discussed with reference to FIG. 5, in view of FIGS. 2 and 3.

At step 70 the state of the transmission such as gear position is identified and routine powertrain parameters and variables, such as vehicle speed, engine throttle position, engine speed and the speed of various shafts are measured.

At step 72 acceleration (or speed or angular position, as the case may be) is measured by sensor(s) 34, and a signal representing that magnitude is transmitted to controller 17. The controller 17 uses the measurements to determine inferred torque transmitted through the input clutch 20, accounting for the gear ratio between the clutch plate location 154 and the sensor's measurement location. This may be accomplished as discussed above relative to FIG. 4.

At step 74 the operator (driver) depresses the clutch pedal 37, which controls the state of clutch 20, and releases the accelerator pedal 38 at step 76 (clutch pedal 37 and accelerator pedal 38 shown in FIG. 4).

At step 78 the operator may (or may not) move the shift lever 28 to the position corresponding to the desired gear.

At step 80 the operator modulates the clutch pedal 37, allowing the clutch to slip while transmitting torque through frictional force.

At step 82 the operator modulates the accelerator pedal 38.

At step 84 controller 17 determines the magnitude of desired clutch slip across clutch 20, and the desired clutch torque capacity of the given vehicle condition determined at 70.

At step 86 controller 17 computes (i) clutch slip error, i.e., the difference between desired clutch slip at step 84 and clutch slip represented by differential speed across clutch 20 as measured at step 70; and (ii) clutch torque error, i.e., the difference between desired clutch torque capacity at step 84 and inferred clutch torque capacity determined at step 72.

At step 88 controller 17 automatically corrects the position of the clutch actuator 18 on the basis of clutch slip error and clutch torque error, such that the errors are reduced, minimized or eliminated.

At step 90 controller 17 automatically corrects engine torque such that the adjusted engine torque augments clutch actuator control 88 to reduce, minimize or eliminate clutch torque and slip error and such that engine torque is compatible with the current diving conditions, including vehicle speed, throttle position and gear position.

At step 92 a test is performed to determine whether clutch 20 is fully engaged. If the clutch is not fully engaged, control returns to steps 80 and 82.

If the clutch is fully engaged, control of clutch-assist mode slipping ends at 94.

Figure 6:
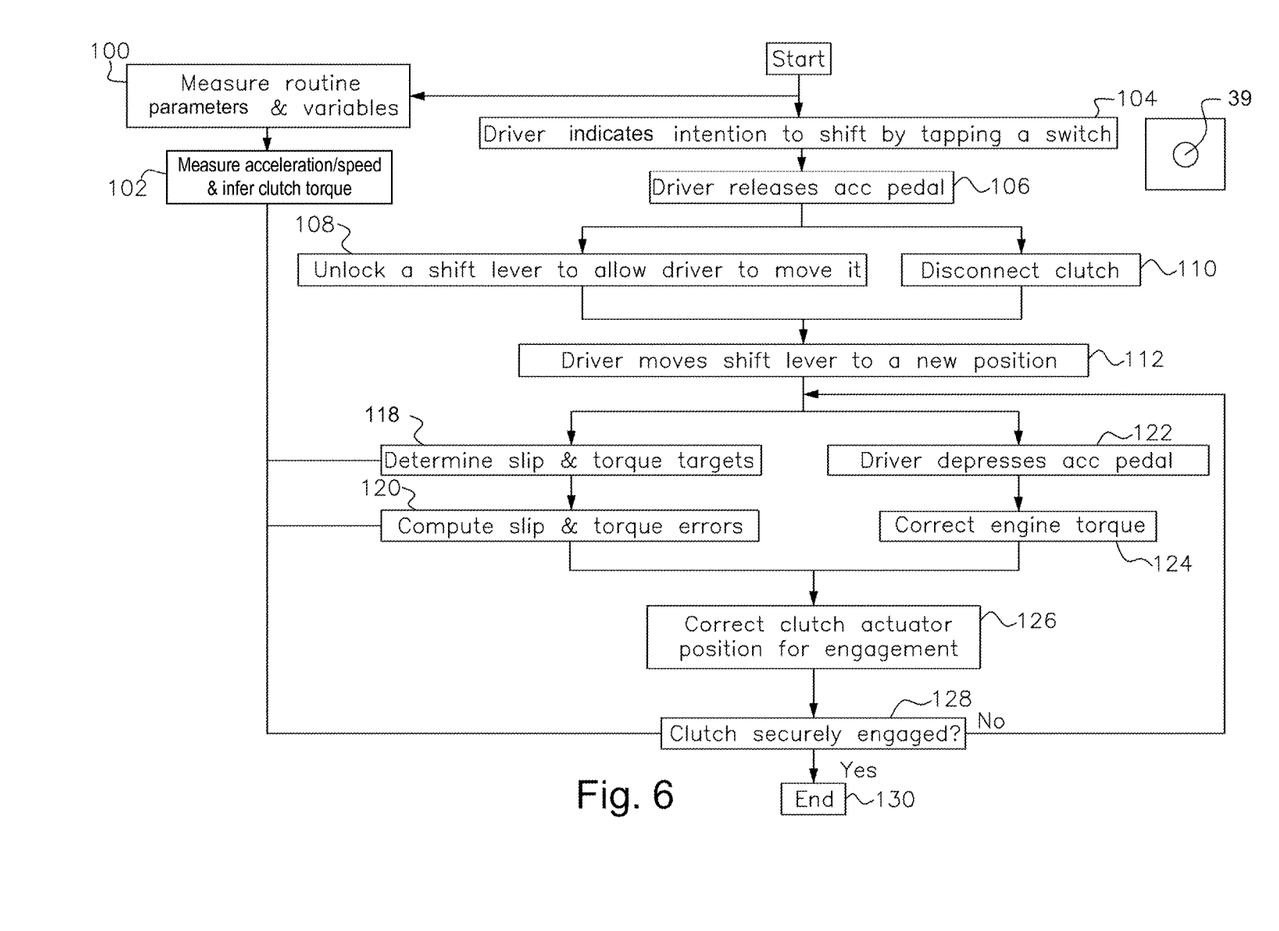
FIG. 6 is a logic diagram representing an algorithm for controlling a gearshift of the manual transmission system of FIG. 2.

An auto-clutch mode for controlling shifting will now be discussed with reference to FIG. 6, in view of FIGS. 2 and 3. The control method (i) automatically opens clutch 20 when the vehicle operator (driver) indicates a desire to produce a gear shift by pressing a hand-actuated button, a foot-actuated switch 39 or any other similar pre-defined mechanism; and (ii) automatically closes or engages clutch 20 after the driver moves the shift lever 28 to the selected gear position. The clutch torque-based control method automatically adjusts the position of clutch actuator 18 to maintain smooth torque transition during the release and engagement of clutch 20. This vehicle shift operation occurs without requiring a driver to manually operate a clutch pedal.

At step 100 the state of the transmission such as gear position is identified and routine powertrain parameters and variables, such as vehicle speed, engine throttle position, engine speed and the speed of various shafts are measured.

At step 102 acceleration (or speed or angular positions, as the case may be) of a rotating components of the transmission system 11 is measured by sensor(s) 34, and a signal representing that magnitude is transmitted to controller 17. The controller 17 uses the measurements to determine inferred clutch torque transmitted through the input clutch 20, accounting for the gear ratio between the clutch plate location 154 and torque sensor location. This may be accomplished as discussed above relative to FIG. 4.

At step 104 the operator indicates a desire for a gear shift by actuating switch 39, though which a signal is transmitted to controller 17.

At step 106 the operator releases the accelerator pedal 38.

At step 108 controller 17 automatically unlocks shift lever 28, thereby allowing the operator to move the shift lever, while the controller 17 automatically activates the clutch actuator 18 to disengage clutch 20, step 110.

At step 112 the operator moves shift lever 28 to the position corresponding to the desired gear to be produced by the gearshift.

At step 118 the controller 17 determines the magnitude of desired clutch slip across clutch 20 and the desired clutch torque given the vehicle conditions determined at 100.

At step 120 controller 17 computes (i) clutch slip error, i.e., the difference between desired clutch slip at step 118 and clutch slip represented by differential speed across clutch 20 as measured at step 100; and (ii) clutch torque error, i.e., the difference between desired clutch torque capacity at step 118 and inferred clutch torque capacity determined at step 102.

At step 122 the operator depresses accelerator pedal 38.

At step 124 controller 17 automatically corrects engine torque such that engine torque is compatible with actual clutch torque capacity and the current diving conditions, including vehicle speed, throttle position and the newly engaged gear. For example, if the engine torque significantly exceeds clutch torque capacity, engine speed excursion or flare may occur. If the engine torque is significantly smaller than clutch torque, engine stall may occur. This automatic adjustment reduces or eliminates these undesirable conditions.

At step 126 the controller 17 automatically corrects the position of clutch actuator 18 such that clutch slip error and clutch torque error are reduced, minimized or eliminated.

At step 128 the controller 17 performs a test to determine whether clutch 20 is fully engaged. If the clutch is not fully engaged, control returns to steps 118 and 122.

If the result of test 128 is positive, control of auto-clutch mode shifting ends at 130.

In accordance with the provisions of the patent statutes, the preferred embodiment has been described. However, it should be noted that the alternate embodiments can be practiced otherwise than as specifically illustrated and described.

The invention claimed is:

1. A method for controlling a manual transmission gearshift, comprising:
   (a) determining, using a controller, a desired clutch torque for a desired gear after a shift-lever is moved to the desired gear, while a clutch pedal is being released;
   (b) measuring rotating component acceleration;
   (c) inferring a clutch torque based on the acceleration;
   (d) reducing clutch torque error by automatically adjusting a clutch actuator such that a difference between the desired and inferred clutch torque is reduced.

2. The method of claim 1, further comprising:
   (e) determining a current engine torque;
   (f) determining, using the controller, a desired engine torque for the desired gear; and
   (g) automatically reducing a difference between the desired engine torque and the current engine torque.

3. The method of claim 1, wherein step (b) further comprises, using an acceleration sensor, mounted adjacent to a rotating component of a transmission system, to measure the rotating component acceleration.

4. The method of claim 1, wherein step (a) further comprises using the controller to determine the desired clutch torque for the desired gear after an accelerator pedal is re-depressed.

5. The method of claim 1 further comprising the steps of:
   (e) using the controller to determine a desired clutch slip of a clutch;
   (f) determining slip across the clutch; and
   (g) reducing clutch slip error by automatically adjusting the clutch actuator such that a difference between the desired and calculated slip is reduced.

6. The method of claim 1 wherein step (b) is further defined by, using a speed sensor, mounted adjacent to a rotating component of a transmission system, and determining a time derivative of an angular velocity to measure the rotating component acceleration.

7. The method of claim 1 wherein step (b) is further defined by using an angular position sensor, mounted adjacent to a rotating component of a transmission system, determining an angular velocity and a time derivative of an angular velocity to measure the rotating component acceleration.

8. The method of claim 1 wherein step (b) is further defined by the rotating component acceleration being measured by a sensor located between a manual transmission and a driven wheel.

9. A method for controlling a manual transmission gearshift, comprising:
   (a) determining, using a controller, a desired clutch torque for a desired gear, after a shift-lever is moved to the desired gear, a clutch pedal is depressed and thereafter released, and an accelerator pedal is released and thereafter depressed;
   (b) measuring rotating component acceleration;
   (c) inferring clutch torque based on the acceleration;

(d) automatically adjusting a clutch actuator such that a difference between the desired and inferred clutch torque is reduced.

10. The method of claim 9, further comprising:
(e) determining a current engine torque;
(f) determining, using the controller, a desired engine torque for the desired gear; and
automatically reducing a difference between the desired engine torque and the current engine torque.

11. The method of claim 9, wherein step (b) further comprises, using an acceleration sensor, mounted adjacent to a rotating component of a transmission system, to measure the rotating component acceleration.

12. The method of claim 9 further comprising the steps of:
(e) using the controller to determine a desired clutch slip of a clutch;
(f) calculating slip across the clutch; and
(g) reducing clutch slip error by automatically adjusting the clutch actuator such that a difference between the desired and calculated slip is reduced.

13. The method of claim 9, wherein step (b) further comprises, using a speed sensor, mounted adjacent to a rotating component of a transmission system, and determining a time derivative of an angular velocity to measure the rotating component acceleration.

14. A method for controlling a manual transmission gearshift, comprising:
(a) a controller unlocking a shift-lever after a switch indicates a desired gearshift, and an accelerator pedal is released;
(b) after the shift-lever is moved to another gear, determining a desired clutch torque for the gear;
(c) measuring rotating component acceleration;
(d) inferring clutch torque based on the acceleration;
(e) automatically adjusting a clutch actuator such that a difference between the desired and inferred clutch torque is reduced.

15. The method of claim 14, further comprising:
determining a current engine torque;
determining, using a controller, a desired engine torque for the new gear; and
automatically reducing a difference between the desired engine torque and the current engine torque.

16. The method of claim 14 wherein step (c) further comprises, using an acceleration sensor, mounted adjacent to a rotating component of a transmission system, to measure the rotating component acceleration.

17. The method of claim 14, wherein step (c) further comprises, using a speed sensor, mounted adjacent to a rotating component of a transmission system, and determining a time derivative of an angular velocity to measure the rotating component acceleration.

18. The method of claim 14 further comprising the steps of:
(e) using the controller to determine a desired clutch slip of a clutch;
(f) calculating slip across the clutch; and
(g) reducing clutch slip error by automatically adjust the clutch actuator such that a difference between the desired and calculated clutch slip is reduced.

19. The method of claim 14 wherein step (c) further comprises, using an angular position sensor, mounted adjacent to a rotating component of a transmission system, determining an angular velocity and a time derivative of an angular velocity to measure the rotating component acceleration.

* * * * *